(12) United States Patent
Boer et al.

(10) Patent No.: US 8,503,577 B2
(45) Date of Patent: Aug. 6, 2013

(54) SIGNAL QUALITY ESTIMATION IN A WIRELESS COMMUNICATION SYSTEM

(75) Inventors: Jan Boer, Odijk (NL); Bas Driesen, Dongen (NL); Ra'anan Gil, Nieuwegein (NL); Kai Roland Kriedte, Woerden (NL)

(73) Assignee: Agere Systems LLC, Allentown, PA (US)

( * ) Notice: Subject to any disclaimer, the term of this patent is extended or adjusted under 35 U.S.C. 154(b) by 2166 days.

(21) Appl. No.: 10/621,862

(22) Filed: Jul. 17, 2003

(65) Prior Publication Data

US 2005/0013391 A1    Jan. 20, 2005

(51) Int. Cl.
*H04L 27/06*    (2006.01)

(52) U.S. Cl.
USPC ........... 375/340; 375/316; 375/346; 375/348; 329/318; 329/320; 329/349; 455/63.1; 455/114.2; 455/278.1; 455/296

(58) Field of Classification Search
USPC .................. 375/340, 316, 346, 348; 702/69, 702/81; 329/318, 320, 349; 455/63.1, 114.2, 455/278.1, 296
See application file for complete search history.

(56) References Cited

U.S. PATENT DOCUMENTS

| | | | |
|---|---|---|---|
| 6,215,827 B1 * | 4/2001 | Balachandran et al. | ...... 375/262 |
| 6,452,964 B1 | 9/2002 | Yoshida | |
| 6,522,696 B1 * | 2/2003 | Mobin et al. | .................. 375/262 |
| 7,443,827 B2 | 10/2008 | Sano | |
| 2003/0157914 A1 * | 8/2003 | Li et al. | .......................... 455/296 |
| 2004/0047296 A1 * | 3/2004 | Tzannes et al. | ............... 370/252 |
| 2005/0130595 A1 * | 6/2005 | Shurvinton et al. | ........ 455/67.11 |

FOREIGN PATENT DOCUMENTS

| | | |
|---|---|---|
| EP | 1 367 752 A1 | 12/2003 |
| EP | 04 25 0993 | 11/2004 |
| JP | 61-270928 | 12/1986 |
| JP | 11-355373 | 12/1999 |
| JP | 2001-86092 A | 3/2001 |
| JP | 2002-199033 | 7/2002 |
| JP | 2002-246958 A | 8/2002 |
| JP | 2002-319919 A | 10/2002 |
| JP | 2003-69530 A | 3/2003 |
| JP | 2003-348046 A | 12/2003 |
| JP | 2004-193670 A | 7/2004 |
| WO | WO 02/067478 | 8/2002 |

OTHER PUBLICATIONS

Maeda et al., "Performance of Forward Link Broadband OFCDM Packet Wireless Access using MMSE Combining Scheme Based on SIR Estimation," Technical Report of IEICE, Oct. 13, 2001, 1 page Abstract, vol. 101, No. 371.

* cited by examiner

*Primary Examiner* — Leila Malek
(74) *Attorney, Agent, or Firm* — Ryan, Mason & Lewis, LLP

(57) ABSTRACT

In a wireless system including a wireless communication channel, a method for estimating a signal quality of a received signal includes the steps of receiving a signal from the wireless communication channel, the received signal including at least one field that is modulated and encoded in a substantially fixed manner, and generating at least one reference field based, at least in part, on the at least one field and on a channel estimation signal. The channel estimation signal is representative of at least one characteristic of the wireless communication channel. The method further includes the step of generating a signal quality estimate as a function of the at least one field in the received signal and the generated at least one reference field.

20 Claims, 3 Drawing Sheets

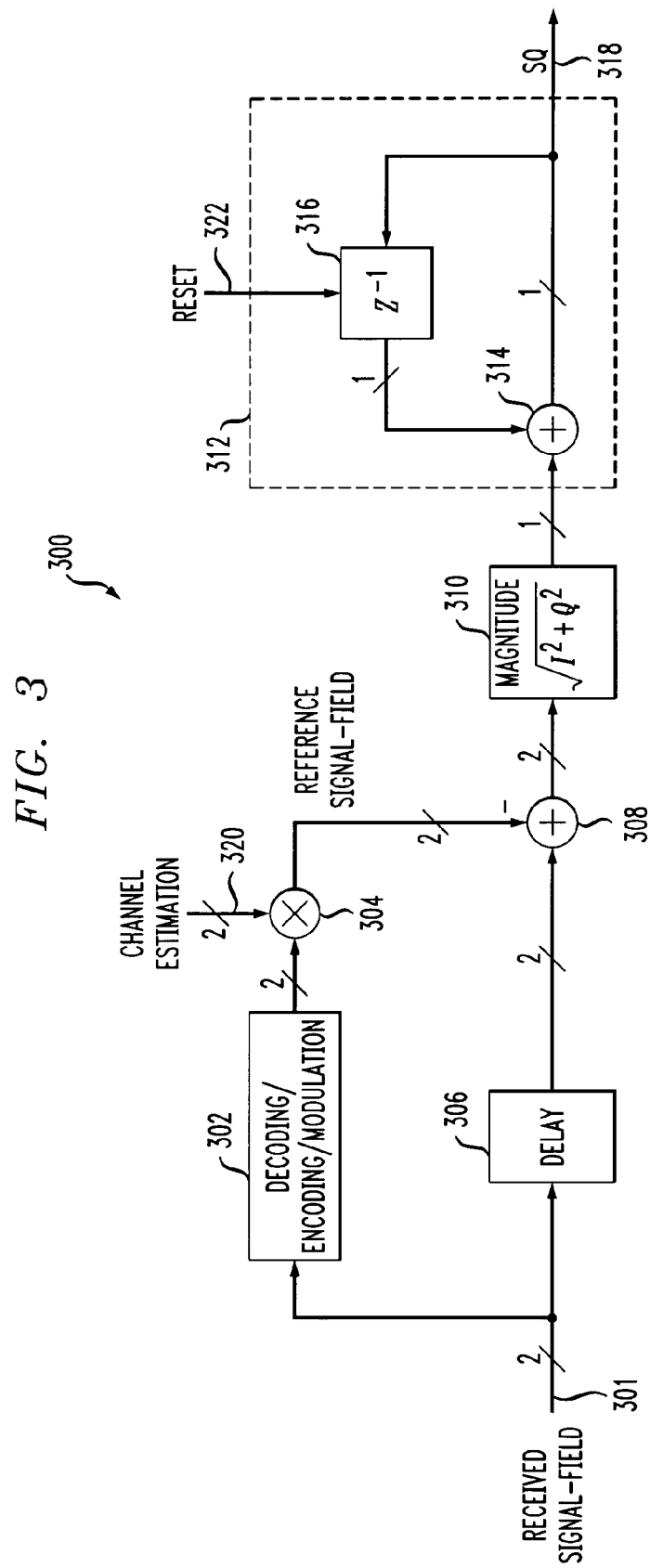

SIGNAL QUALITY ESTIMATION IN A WIRELESS COMMUNICATION SYSTEM

CROSS-REFERENCE TO RELATED APPLICATION(S)

This application relates to commonly assigned U.S. application Ser. No. 10/305,554, filed on Nov. 27, 2002 and entitled "Data Transmission Rate Adaptation in a Wireless Communication System," the disclosure of which is incorporated by reference herein.

FIELD OF THE INVENTION

The present invention relates generally to communication systems, and more particularly relates to techniques for estimating signal quality in a wireless communication system.

BACKGROUND OF THE INVENTION

In a conventional wireless communication system including a pair of transceivers communicating with one another over a wireless communication channel, there are typically a number of different data transmission rates available at which to transmit data. Generally, the higher the data rate, the more susceptible the system is to errors. Under certain circumstances, it is necessary to adapt the system to higher or lower data transmission rates based, at least in part, on environmental conditions. For example, noise on the communication channel, transceiver impairments, etc., may necessitate operation of the system at a lower data transmission rate.

The Institute of Electrical and Electronics Engineers (IEEE) 802.11 standard addresses medium access control over a wireless local area network (WLAN). The IEEE 802.11 standard is set forth in the document IEEE Std. 802.11, entitled *Supplement to IEEE Standard for Information Technology—Telecommunications and Information Exchange Between Systems—Local Metropolitan Area Networks—Specific Requirements—Part 11: Wireless LAN Medium Access Control (MAC) and Physical Layer (PHY) Specifications,* 1999 Edition, which is incorporated herein by reference. Additional extensions relating to the 802.11 standard, including IEEE Std. 802.11a, entitled *High Speed Physical Layer* in the 5 GHz Band, February 2000, and IEEE Std. 802.11g, entitled *Further Higher Data Rate Extension in the 2.4 GHz Band*, September 2000, are also incorporated herein by reference. Rate adaptation in a wireless communication system operating in accordance with the 802.11 standard generally takes place in the transmitter at the MAC level. Known rate adaptation schemes typically rely on information acquired through acknowledgment messages received after each correctly transmitted data packet.

An acknowledgment message indicates a correctly received packet, while an absence of an acknowledgment message is generally interpreted as an error. A determination as to whether to change the data rate in the transmitter can be made in response to the number of consecutive acknowledgments that are received. After a certain number of correctly received data packets, the transmitter typically attempts to switch to a higher data transmission rate. Similarly, after a certain number of consecutive errors, the transmitter attempts to switch to a lower data transmission rate. This conventional rate-switching methodology, which is based on received acknowledgments, has the advantage of simplicity. However, it often changes the data transmission rate of the transmitter to a value that is either too high or too low, thus undesirably impacting the throughput of the system. For example, switching to a lower data rate when, in fact, a higher rate can be supported by the system results in a significant throughput degradation. The same is true when switching to a higher data rate than the system can support, thus resulting in a high packet error rate (PER), bit error rate (BER), or frame error rate (FER).

It would be desirable, therefore, to be able to obtain an accurate estimate of the signal quality of a received signal for, among other applications, controlling the data transmission rate in a wireless communication system, which addresses the above-mentioned problems exhibited in conventional wireless communication systems.

SUMMARY OF THE INVENTION

The present invention provides techniques for accurately estimating a signal quality of a received signal in a wireless communication system, the received signal typically being a baseband signal. The signal quality estimation can be employed, for example, in a receiver associated with the wireless communication system for advantageously adapting a data transmission rate of the wireless communication system to varying conditions in the system. Such varying conditions may include, for instance, impairments in a wireless communication channel associated with the system, impairments in a transceiver communicating over the wireless communication channel, etc. Channel impairments which may undesirably affect the ability of a signal to pass through the channel include, for example, co-channel interference, delayed signal interference, narrowband interference (e.g., from intermodulation products), thermal noise, etc. According to the invention, the signal quality estimation is based, at least in part, on a specific portion of a received data packet.

In accordance with one aspect of the invention, in a wireless system including a wireless communication channel, a method for estimating a signal quality of a received signal includes the steps of receiving a signal from the wireless communication channel, the received signal including at least one field that is modulated and encoded in a substantially fixed manner, and generating at least one reference field based, at least in part, on the at least one field and on a channel estimation signal. The channel estimation signal is representative of at least one characteristic of the wireless communication channel. The method further includes the step of generating a signal quality estimate as a function of the at least one field in the received signal and the generated at least one reference field.

In accordance with another aspect of the invention, in a wireless system including at least one transceiver configurable for communicating over a wireless communication channel, the transceiver including a transmitter and a receiver, a method for controlling a data transmission rate of the at least one transceiver includes the steps of receiving a signal from the wireless communication channel, the received signal including at least one field that is modulated and encoded in a substantially fixed manner and generating at least one reference field based at least in part on the at least one field and on a channel estimation signal. The channel estimation signal is representative of at least one characteristic of the wireless communication channel. The method further includes the steps of comparing the at least one field in the received signal with the at least one reference field and generating a difference signal corresponding thereto, generating a signal quality estimate which is a function of the difference signal, and modifying the data transmission rate of the transmitter based, at least in part, on the signal quality estimate.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 is a block diagram depicting an illustrative methodology for determining a signal quality estimation, in accordance with one aspect of the invention.

DETAILED DESCRIPTION OF THE PREFERRED EMBODIMENTS

The present invention will be described herein in the context of an EEE 802.11 compliant orthogonal frequency division multiplexing (OFDM) wireless communication system. It should be appreciated, however, that the present invention is not limited to this or any particular wireless communication system. Rather, the invention is more generally applicable to techniques for accurately estimating the signal quality of a received baseband signal in a wireless communication system. The signal quality estimation may be employed, in accordance with one aspect of the invention, for optimally controlling a data transmission rate in a wireless system. Although particularly well-suited for use in conjunction with the EEE 802.11 standard, the invention can be used with other standards, as well as in non-standard systems.

Figure 1:
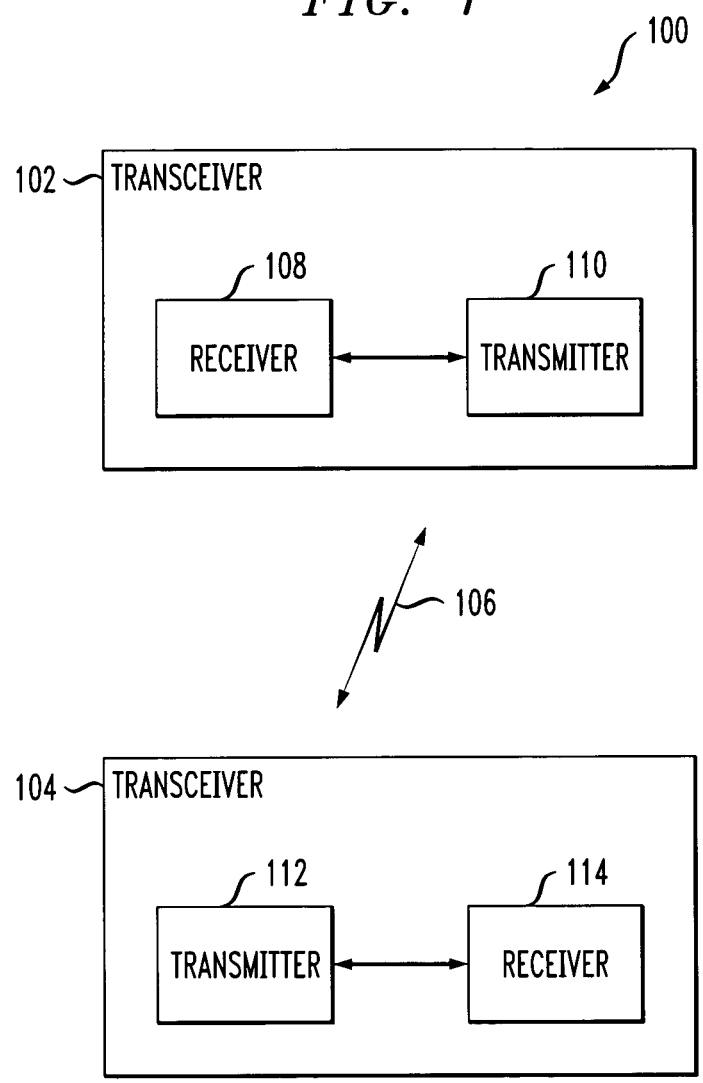
FIG. 1 is a block diagram illustrating an exemplary wireless communication system in which the techniques of the present invention may be implemented.

FIG. 1 depicts an exemplary wireless communication system 100 in which the methodologies of the present invention may be implemented. The exemplary wireless communication system 100 includes a pair of transceivers 102 and 104 communicating with one another via a communication channel 106 established between the two transceivers 102, 104. Channel 106 may be a wireless communication link, such as, but not limited to, radio frequency (RF), infrared (IR), microwave, etc., although alternative communication media may be used. The channel 106 may have a certain data rate associated therewith which determines how many samples per second can be transmitted on that particular media. Transceiver 102 preferably comprises a receiver 108 for receiving signals from the channel 106, and a transmitter 110 for sending signals over the channel 106. Similarly, transceiver 104 comprises a receiver 114 and a transmitter 112. Receivers and transmitters suitable for use with the present invention are well known by those skilled in the art. Accordingly, a detailed discussion of such receivers and transmitters will not be presented herein.

A signal quality estimation of a received baseband signal can be useful, for example, for adapting the data transmission rate of transmissions over the wireless communication channel 106. Therefore, in accordance with one aspect of the invention, a signal quality estimation is preferably determined at a receiver side, which may be exemplified by receiver 108, in a given transceiver, which may be exemplified by transceiver 102. When used in a data transmission rate adaptation methodology, the signal quality estimation, which represents an estimate of the signal quality through at least the communication channel 106, is made available to the corresponding transmitter 110 in the transceiver 102, since the transmitter typically sets the data transmission rate of transmissions over the channel 106. The receiver 108 preferably derives the signal quality estimation by processing a specific portion of a received baseband signal, which may comprise, for example, a data frame or a control frame (e.g., an acknowledgment message). As previously stated, channel impairments which may undesirably affect the ability of a signal to pass through the channel 106 include, for example, co-channel interference, delayed signal interference, narrowband interference, thermal noise, etc. Assuming quasi-static symmetric channel transfer characteristics and transceiver impairments, acknowledgment messages undergo essentially the same signal degradation as the actual data sent and thus will be substantially the same in quality.

Figure 2A:
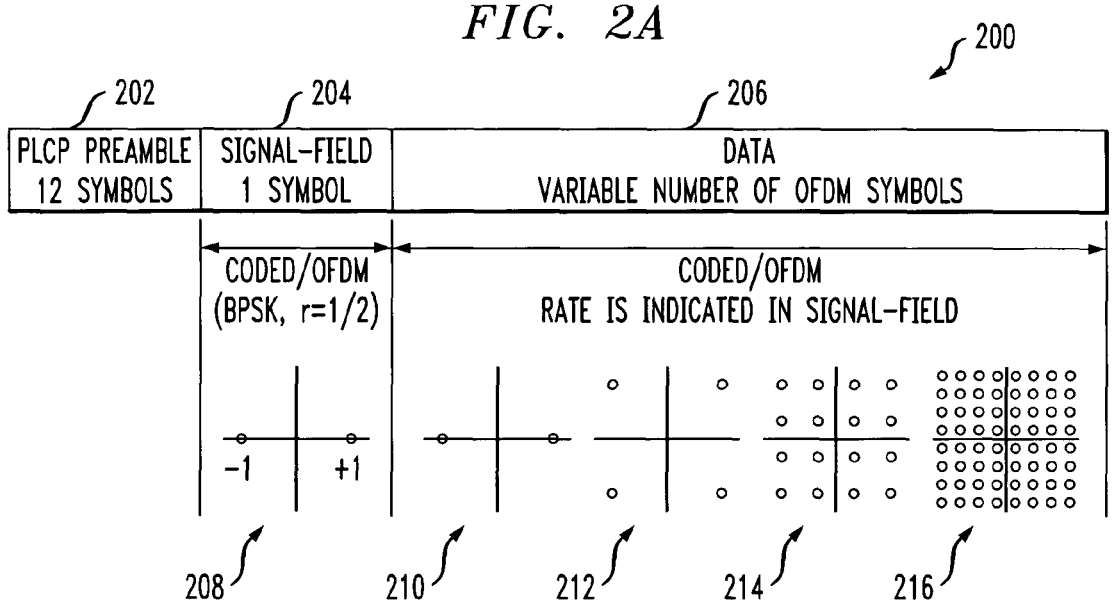
FIGS. 2A and 2B are graphical representations illustrating a standard EEE 802.11 frame format.
Figure 2B:
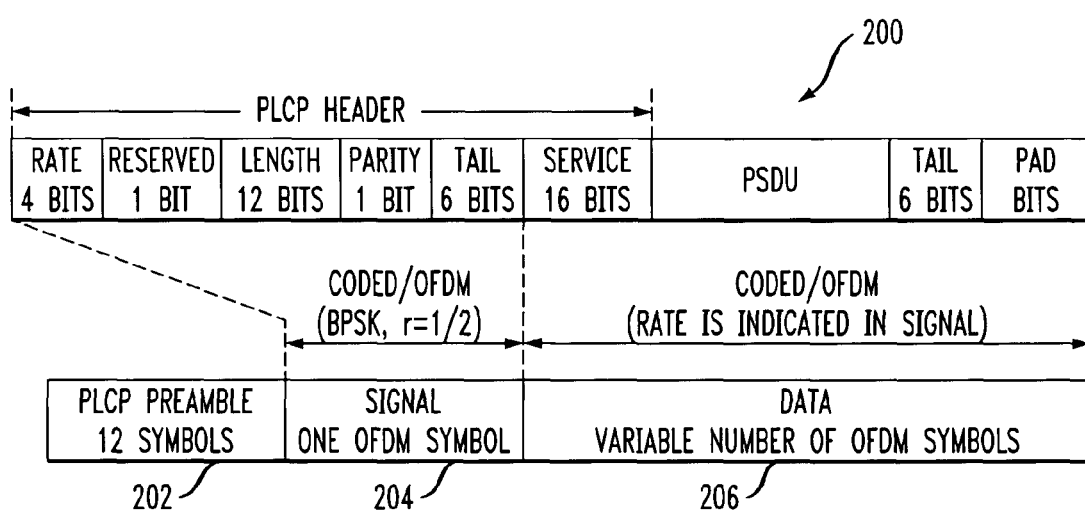

By way of example only, FIGS. 2A and 2B illustrate a standard IEEE 802.11 physical layer convergence procedure (PLCP) frame format 200 representing a transmitted frame in the exemplary wireless communication system. In multi-carrier systems, as well as single-carrier systems, the IEEE 802.11 standard specifies that each frame includes a preamble 202, a SIGNAL field 204 and a data field 206. The preamble 202 comprises 12 orthogonal frequency division multiplexed (OFDM) symbols that are used primarily for synchronization purposes. The SIGNAL field 204 and a portion of the data field 206 form a PLCP header (see FIG. 2B) which is used primarily to specify, among other things, a length and rate of the payload data.

With reference to FIG. 2B, the PLCP header includes a RATE field (4 bits), a reserved bit, a LENGTH field (12 bits), an even parity bit, tail bits (6 bits), and a SERVICE field (16 bits). In terms of modulation, the LENGTH, RATE, reserved bit and parity bit (with six "zero" tail bits appended thereto) constitute a separate single OFDM symbol denoted as the SIGNAL field 204, which includes 48 samples. The six "zero" tail bits are inserted into the PLCP header in order to facilitate a reliable and timely detection of the RATE and LENGTH fields, which are generally required for decoding the DATA field 206, according to the IEEE 802.11 specification.

The preamble 202 and SIGNAL field 204 are modulated and encoded in a fixed manner, which may be simple and robust in comparison to the payload data in order to ease synchronization and reception of the transmitted data frame. For example, in an IEEE 802.11a/g OFDM multi-carrier system, the preamble and SIGNAL field may employ a robust combination of binary phase shift keying (BPSK) modulation and binary convolutional coding (BCC) at a coding rate, R, of one-half (i.e., R=½). The payload data comprising the DATA field 206 can be of varying length and encoded using various coding rates and/or modulation schemes throughout the data packets, as may be specified by the SIGNAL field 204. For example, the IEEE 802.11 standard supports a number of different modulation techniques for modulating the data, including BPSK, quadrature phase shift keying (QPSK), 16-point quadrature amplitude modulation (16-QAM) and 64-point QAM (64-QAM). FIG. 2A illustrates signal constellation representations for each of the modulation schemes supported by the IEEE 802.11 standard. For instance, signal constellations 208 and 210 depict BPSK modulation, signal constellation 212 depicts QPSK modulation, signal constellation 214 depicts 16-QAM and signal constellation 216 depicts 64-QAM.

Although the transmitted data in the DATA field 206 may comprise a varying number of OFDM symbols, data rates and/or modulation schemes, the SIGNAL field is always modulated and encoded in the same manner, for example, using BPSK modulation at a coding rate of one-half in accordance with the IEEE 802.11 specification, as previously explained. Because a known modulation scheme and coding rate are always employed in the SIGNAL field of the transmitted frame 200, the expected SIGNAL field of the received frame can be easily predicted. Consequently, the actual information comprised in the SIGNAL field of a received frame can be advantageously used to derive an accurate signal quality estimation that is substantially independent of the payload data.

According to at least the above-cited 802.11a and 802.11g extensions to the 802.11 standard, the SIGNAL field includes 24 bits that are rate one-half encoded and BPSK modulated, resulting in 48 samples located at phases of +1 or −1 in the signal constellation representation 208 depicted in FIG. 2A, as will be understood by those skilled in the art. Assume that the SIGNAL field can be detected without errors. This is a reasonable assumption since the SIGNAL field is generally encoded and modulated in a more robust manner in comparison to the rest of the packet (e.g., the DATA field). Furthermore, if after demodulation and decoding of the received SIGNAL field an error occurs, the remaining packet cannot be detected anyway.

In accordance with one embodiment of the present invention, the fixed-modulated and/or encoded portion of a given received packet (e.g., the received SIGNAL field in an IEEE 802.11 packet) is compared with a reference field representing the original modulation and encoding scheme that has been corrected for channel conditions (i.e., channel-corrected modulation scheme). The signal quality estimation may then be derived as a function of a difference between the received field and the reference field. A signal quality indication, representing the estimation of signal quality, is preferably acquired for each received packet. As previously stated, this signal quality indication can be utilized to dynamically adapt the data transmission rate of the communication channel. In this manner, a data throughput in the wireless communication system can be optimized.

In accordance with another embodiment of the invention, signal quality may be determined using alternative techniques, such as, but not limited to, measuring a signal-to-noise ratio (SNR), bit error rate (BER), cyclic redundancy code (CRC), and/or checksum(s) of the fixed modulated/encoded portion of the received signal (e.g., PLCP header). Again, the signal quality can be used in a data rate adaptation methodology. For instance, when the measured SNR is below a certain threshold, the data rate is preferably lowered, and when the measured SNR is greater than a desired threshold, the data rate is preferably increased. In a similar manner, the BER or the checksum on the PLCP header can be utilized, for example, by comparing the BER or checksum, respectively, to certain thresholds and then changing the data rate of the data packet based on whether or not the measured BER and checksum is above or below a desired threshold. In the case of CRC measurements, when a number of errors corrected using the CRC exceeds a specified number, then the data rate of the data packet is preferably lowered accordingly.

Using conventional rate-switching approaches, the data transmission rate is often undesirably lowered too quickly, especially in high-density areas. This may be attributed to a higher probability of collisions occurring between different stations which often cause acknowledgment messages to be missed. As previously explained, a missed acknowledgment message is, in this case, incorrectly interpreted by the transmitter as an error, thus undesirably initiating the rate-switching procedure. Accordingly, another aspect of the present invention advantageously provides an improved rate-switching methodology which allows the wireless communication system to more optimally switch the transmission rate over the channel and is more reliable than conventional rate-switching approaches. Moreover, the present invention is not limited to rate-switching in single level increments, but may selectively change the rate in larger (or smaller) increments as desired.

In an exemplary IEEE 802.11a/g multi-carrier system, rate adaptation takes place inside the transmitter at a medium access control (MAC) layer. As previously stated, in accordance with an illustrative aspect of the invention, a representative signal quality estimation is determined at the receiver side and is provided to the corresponding transmitter associated with a given transceiver. The signal quality estimate corresponding to a received signal (e.g., a packet) is preferably representative of a condition of the communication channel at a given time. The receiver can measure the signal quality, for example, by processing an incoming message, which may include payload and/or acknowledgment data. When assuming quasi-static symmetric channel transfer characteristics and transceiver impairments, the processed message will undergo substantially the same degradation as the actual data sent, and thus the two will be substantially equal in terms of signal quality. The transmitter then bases its rate-switching decision, at least in part, on the signal quality estimate.

FIG. 3 illustrates a block diagram of an exemplary circuit 300 for implementing a methodology for computing the signal quality estimation, in accordance with one aspect of the invention. Circuit 300 may be implemented in the receiver of a given transceiver. Alternatively, circuit 300 may be implemented externally to the receiver, such as being incorporated into the transmitter or in a separate section of the transceiver, e.g., a controller (not shown). The exemplary signal quality estimation methodology preferably involves generating a reference SIGNAL field by first demodulating and decoding the received SIGNAL field, followed by encoding and modulating the SIGNAL field and applying a channel estimate. The resulting reference SIGNAL field excludes contribution such as, for example, channel noise and impairments associated with the channel, transmitter and/or receiver. The received SIGNAL field is then compared with the reference SIGNAL field. This will result in 48 complex values, one value for each of the corresponding samples in the SIGNAL field. Taking the magnitude of the 48 complex values and summing them together results in an signal quality estimation for that specific packet.

For ease of explanation, the exemplary circuit 300 may be described in terms of functional blocks, including a decoding/encoding/modulation block 302 coupled to a first input 301 of the circuit 300, a multiplier 304 coupled to an output of the decoding/encoding/modulation block 302, a delay block 306 coupled to the first input 301 of the circuit 300, a comparator 308 coupled to respective outputs of the delay block 306 and multiplier 304, a magnitude block 310 coupled to an output of the comparator 308, and an integrator 312 coupled to an output of the magnitude block 310. An output of the integrator 312 preferably forms an output 318 of the circuit 300. Although shown as separate functional blocks, at least a portion of one or more of the blocks comprising the exemplary circuit 300 may be combined and/or integrated with one or more other functional blocks, and certain portions of the combined functional blocks may be shared, as will be understood by those skilled in the art. A more detailed explanation of the operation of circuit 300 is presented herein below.

A received signal, which may comprise in-phase (I) and quadrature (Q) components, is preferably fed, substantially in parallel, to the decoding/encoding/modulation block 302 and to the delay block 306. The received signal may comprise, for example, the SIGNAL field of a received packet or an alternative portion thereof using a known fixed modulation and encoding scheme. Block 302 is preferably configurable for processing the received signal such that the originally transmitted signal, comprising the original SIGNAL field, is recovered. This may be accomplished by first demodulating (e.g., using a slicer) and decoding (e.g., using a Viterbi decoder) at least the received SIGNAL field. Decoding of the SIGNAL field is typically performed anyway in order to obtain such crucial information as the data rate and length of the data packet. The SIGNAL field is then encoded and modulated in substantially the same manner as the originally transmitted packet (e.g., using convolutional coding and BPSK modulation). The output of block 302 comprises the recovered SIGNAL field, which is subsequently used to generate a reference SIGNAL field.

The recovered SIGNAL field generated by block 302 is fed to multiplier 304 where it is combined with a channel estimation signal presented to a second input 320 of the exemplary circuit 300. The channel estimation signal preferably represents an estimate of the channel characteristics, which may include an influence of the communication channel (e.g., noise, system impairments, etc.) in the wireless communication system. The channel estimation signal can be derived, for example, from training symbols (e.g., short and/or long training symbols) that are typically sent in the preamble of an IEEE 802.11 PLCP frame transmitted in advance of the SIGNAL field. An alternative mechanism for deriving the channel estimation signal is contemplated by the present invention. The reference SIGNAL field will be generated at the output of the multiplier 304.

The reference SIGNAL field and the delayed version of the received SIGNAL field are preferably fed to the comparator 308. The delayed version of the received SIGNAL field may be generated, for example, by passing the received SIGNAL field through the delay block 306, the delay block having a fixed delay value associated therewith. In a preferred embodiment of the invention, the delay value is substantially matched to the processing time required to generate the reference SIGNAL field (e.g., through blocks 302 and 304), and is thus dependent on the actual latency associated with the particular implementation of the circuit 300, as will be understood by those skilled in the art. In this manner, the delayed version of the received SIGNAL field will arrive at the comparator 308 at substantially the same time as the reference SIGNAL field.

The comparator 308 is preferably configured for generating a difference signal at its output, such as, for example, by subtracting the reference SIGNAL field from the delayed received SIGNAL field. The difference signal generated by the comparator 308 is, in essence, an error signal which is preferably based on certain characteristics (e.g., noise, etc.) associated with at least the transceiver and/or the communication channel. The comparator 308 determines the quality of the communication channel, in accordance with one aspect of the invention, by comparing constellation points of the received (unprocessed) SIGNAL field with corresponding constellations points of the reference SIGNAL field. The quality of the channel is directly correlated to the distance (i.e., mismatch) between corresponding constellation points of the received and reference SIGNAL fields. This distance may be measured, for example, as a Euclidean distance, as will be understood by those skilled in the art.

As the constellation points of the received SIGNAL field become closer to the corresponding constellation points of the reference SIGNAL field, this is indicative of an improvement in channel quality. Likewise, as the constellation points of the received SIGNAL field become further away from the corresponding constellation points of the reference SIGNAL field, this is indicative of a degradation in channel quality. Thus, an accurate estimation of the signal quality can be obtained, based at least in part on a difference between the two sets of constellation points.

A magnitude of the difference signal, which may comprise I and Q components, is subsequently computed at block 310. The magnitude is preferably determined by taking a square root of the squared I and Q components of the difference signal, as known by those skilled in the art. Alternative methods for determining the magnitude of the difference signal are also contemplated by the present invention. The magnitude values of difference signals corresponding to the 48 samples in the received SIGNAL field are subsequently added together by integrator 312, and the resulting number may be used to represent the signal quality estimation (SQ) generated at the output 318 of the exemplary circuit 300.

As an alternative to obtaining the magnitude of the difference signal, a power measurement of the difference signal may be obtained, in accordance with another embodiment of the invention. Using the power measurement of the difference signal rather than the magnitude has an advantage of eliminating the square root operation, which can be costly to implement. Power measurements of the difference signals corresponding to the 48 samples in the received SIGNAL field may be subsequently processed by the integrator 312 in a manner consistent with the processing of the magnitude values of the difference signals, as described above.

The integrator 312 may comprise a summation block 314 operatively coupled to a delay block 316 which at least temporarily stores a previous magnitude value. The integrator 312 is preferably configurable to add a magnitude value corresponding to a present sample and a magnitude value corresponding to a previous sample. This integration procedure may be performed until all 48 samples associated with the SIGNAL field of a given packet have been processed, thereby obtaining an average magnitude value for the given packet. The delay block 316 is preferably reset after all 48 samples in the SIGNAL field of a given packet have been processed. It is to be appreciated that alternative methodologies for computing an average of the magnitude values are contemplated by the invention. For instance, each of the magnitude values corresponding to the 48 samples in the received SIGNAL field may be at least temporarily stored in memory and added in parallel, such as with a 48-bit adder.

As previously explained, the received signal preferably comprises a fixed modulated and/or encoded portion (e.g., header) that can be used to derive the signal quality estimation. In the case of an 802.11-type data packet, for example, at least a second portion of the received signal (e.g., the payload data) is not modulated and/or encoded in a fixed manner, but rather the modulation and/or encoding scheme utilized may vary. In accordance with another aspect of the invention, the modulation and/or encoding of the second portion of the received signal is changed based, at least in part, on the signal quality estimate.

In accordance with another aspect of the invention, the methodology for determining the signal quality estimation may be utilized, in whole or in part, in a circuit (not shown) for controlling the data transmission rate of a transceiver. The circuit for controlling the data transmission rate may include a controller (not shown) that is configurable for performing at least a portion of the methodologies of the invention described herein. The term controller, as used herein, is intended to include any processing device, such as, for example, one that includes a central processing unit (CPU) and/or other processing circuitry (e.g., microprocessor). The controller and/or processing blocks can also be implemented as dedicated circuitry in hardware. Additionally, it is to be understood that the term "controller" may refer to more than one controller device, and that various elements associated with a controller device may be shared by other controller devices. Moreover, the circuit(s) for performing the methodologies of the present invention as described herein may be implemented, at least in part, in a semiconductor device, which may comprise more than one such circuit(s), as will be understood by those skilled in the art.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims. For example, the invention can be used with standards other than IEEE 802.11 (e.g., IEEE 802.15), as well as in non-standard applications.

What is claimed is:

1. A circuit for estimating a signal quality of a signal received from a wireless communication channel, the received signal comprising at least one field that is modulated and encoded, the circuit comprising:
   a processor configured to generate at least one reference field based, at least in part, on the at least one field in the received signal and on a channel estimation signal, the channel estimation signal being representative of at least one characteristic of the wireless communication channel; and
   a comparator coupled to the processor, the comparator being configured to generate a signal quality estimate as a function of a difference between the at least one reference field and the at least one field in the received signal;
   wherein the processor comprises:
   a slicer configured to receive the at least one field in the received signal and to recover therefrom a plurality of received symbol bits associated with the at least one field;
   a decoder configured to correct one or more errors potentially present in the received symbol bits, the corrected received symbol bits corresponding to originally transmitted symbol bits in the at least one field;
   an encoder configured to encode the corrected received symbol bits;
   a modulator configured to convert the encoded corrected received symbol bits to a baseband signal; and
   a multiplier configured to combine the baseband signal and the channel estimation signal and to generate the at least one reference field based at least in part on the baseband signal and on the channel estimation signal.

2. The circuit of claim 1, wherein generating the signal quality estimate comprises measuring a difference between one or more constellation points associated with the at least one reference field and one or more corresponding constellation points associated with the at least one field in the received signal.

3. The circuit of claim 2, wherein the measured difference comprises a Euclidean distance.

4. The circuit of claim 2, wherein generating the signal quality estimate further comprises:
   aligning the one or more constellation points associated with the at least one field in the received signal with the one or more corresponding constellation points associated with the at least one reference field; and
   generating difference signals for each of at least a portion of samples in the at least one field in the received signal,, each of the difference signals being representative of a difference between the at least one field in the received signal and the corresponding at least one reference field.

5. The circuit of claim 1, wherein the comparator is further configured to delay the at least one field in the received signal by an amount substantially equal to a latency associated with generating the at least one reference field.

6. The circuit of claim 1, wherein the comparator is further configured to:
   generate a difference signal representative of a difference between the at least one field in the received signal and the at least one reference field; and
   determine a magnitude of the difference signal, the signal quality estimate being a function of the magnitude of the difference signal.

7. The circuit of claim 6, wherein the comparator is further configured to average at least a portion of magnitudes of difference signals corresponding to a plurality of samples in the at least one field in the received signal, each of the difference signals being representative of a difference between the at least one field in the received signal and the at least one reference field for a given one of the samples, the signal quality estimate being a function of the averaged magnitudes.

8. The circuit of claim 7, wherein the comparator is further configured to add a magnitude value corresponding to a present sample in the at least one field in the received signal to a magnitude value corresponding to a previous sample in the at least one field in the received signal.

9. The circuit of claim 7, wherein the number of samples in the at least one field in the received signal is 48.

10. The circuit of claim 1, wherein the comparator is further configured to:
    generate a difference signal representative of a difference between the at least one field in the received signal and the at least one reference field; and
    measure a power of the difference signal, the signal quality estimate being a function of at least the power measurement of the difference signal.

11. The circuit of claim 10, wherein the comparator is further configured to average at least a portion of power measurements of difference signals corresponding to, a plurality of samples in the at least one field in the received signal, the signal quality estimate being a function of the averaged power measurements.

12. The circuit of claim 1, wherein at least a portion of the received signal is organized as an Institute of Electrical and Electronics Engineers (IEEE) standard 802.11 frame, the at least one field in the received signal comprising a SIGNAL field in the IEEE 802.11 frame.

13. The circuit of claim 1, wherein the channel estimation signal is obtained at least prior to generating the at least one reference field.

14. The circuit of claim 1, wherein the received signal comprises at least one training symbol and the channel estimation signal is computed based at least in part on the at least one training symbol in the received signal.

15. The circuit of claim 1, wherein the received signal comprises a second field having a variable modulation and encoding, the processor being further configured to change at least one of the modulation and the encoding of the second field based, at least in part, on the signal quality estimate.

16. The circuit of claim 1, wherein the at least one characteristic comprises at least one of signal-to-noise ratio, bit error rate, cyclic redundancy code, and checksum of the first field in the received signal.

17. A semiconductor device including at least one circuit for estimating a signal quality of a signal received from a wireless communication channel, the received signal comprising at least one field that is modulated and encoded, the at least one circuit comprising:

a processor configured to generate at least one reference field based, at least in part, on the at least one field in the received signal and on a channel estimation signal, the channel estimation signal being representative of at least one characteristic of the wireless communication channel; and a comparator coupled to the processor, the comparator being configured to generate a signal quality estimate as a function of a difference between the at least one reference field and the at least one field in the received signal;

wherein the processor comprises:

a slicer configured to receive the at least one field in the received signal and to recover therefrom a plurality of received symbol bits associated with the at least one field;

a decoder configured to correct one or more errors potentially present in the received symbol bits, the corrected received symbol bits corresponding to originally transmitted symbol bits in the at least one field;

an encoder configured to encode the corrected received symbol bits;

a modulator configured to convert the encoded corrected received symbol bits to a baseband signal; and a multiplier configured to combine the baseband signal and the channel estimation signal and to generate the at least one reference field based at least in part on the baseband signal and on the channel estimation signal.

18. The semiconductor device of claim 17 wherein generating the signal quality estimate comprises measuring a difference between one or more constellation points associated with the at least one reference field and one or more corresponding constellation points associated with the at least one field in the received signal.

19. A method comprising the steps of:

receiving a signal from a wireless communication channel, the received signal comprising at least one field that is modulated and encoded;

generating at least one reference field based, at least in part, on the at least one field in the received signal and on a channel estimation signal, the channel estimation signal being representative of at least one characteristic of the wireless communication channel;

generating a signal quality estimate as a function of a difference between the at least one reference field and the at least one field in the received signal;

wherein the step of generating the at least one reference field further comprises: receiving the at least one field in the received signal and recovering therefrom a plurality of received symbol bits associated with the at least one field; correcting one or more errors potentially present in the received symbol bits, the corrected received symbol bits corresponding to originally transmitted symbol bits in the at least one field; encoding the corrected received symbol bits; converting the encoded corrected received symbol bits to a baseband signal; and combining the baseband signal and the channel estimation signal and generating the at least one reference field based at least in part on the baseband signal and on the channel estimation signal;

wherein the steps of the method are performed by at least one processing device comprising a processor coupled to a memory.

20. The method of claim 19, wherein the step of generating the signal quality estimate comprises measuring a difference between one or more constellation points associated with the at least one reference field and one or more corresponding constellation points associated with the at least one field in the received signal.

* * * * *